United States Patent [19]
Mallick et al.

[11] Patent Number: 5,872,948
[45] Date of Patent: Feb. 16, 1999

[54] PROCESSOR AND METHOD FOR OUT-OF-ORDER EXECUTION OF INSTRUCTIONS BASED UPON AN INSTRUCTION PARAMETER

[75] Inventors: Soummya Mallick; Rajesh Bikhubhai Patel; Romesh Mangho Jessani; Michael Putrino, all of Austin, Tex.

[73] Assignee: International Business Machines Corporation, Armonk, N.Y.

[21] Appl. No.: 616,613

[22] Filed: Mar. 15, 1996

[51] Int. Cl.⁶ ........................................................ G06F 9/28
[52] U.S. Cl. .............................................................. 395/390
[58] Field of Search .................................... 395/800, 376, 395/377, 382, 390, 392

[56] References Cited

U.S. PATENT DOCUMENTS

| | | | |
|---|---|---|---|
| 5,434,987 | 7/1995 | Abramson et al. | 395/375 |
| 5,555,432 | 9/1996 | Hinton et al. | 395/800 |
| 5,574,935 | 11/1996 | Vidwans et al. | 395/800 |
| 5,606,670 | 2/1997 | Abramson et al. | 395/250 |
| 5,699,537 | 12/1997 | Sharangpani et al. | 395/393 |

*Primary Examiner*—David Y. Eng
*Attorney, Agent, or Firm*—Casimer K. Salys; Brian F. Russell; Andrew J. Dillon

[57] ABSTRACT

A processor and method for out-of-order execution of instructions are disclosed which fetch a first and a second instruction, wherein the first instruction precedes the second instruction in a program order. A determination is made whether execution of the second instruction is subject to execution of the first instruction. In response to a determination that execution of the second instruction is subject to execution of the first instruction, the second instruction is selectively executed prior to the first instruction in response to a parameter of at least one of the first and second instructions. In one embodiment, the parameter is an execution latency parameter of the first and second instructions.

24 Claims, 4 Drawing Sheets

| | 1 | 2 | 3 | 4 | 5 | 6 | 7 |
|---|---|---|---|---|---|---|---|
| INSTRUCTION FETCH | 1,2 | 3,4 | | | | | |
| DISPATCH | | 1 | ✗ | 2 | 3 | 4 | |
| MULTIPLY | | | 1 | 1 | 2 | | |
| ADD | | | | 1 | 1 | 2 | |
| NORMALIZE/ ROUND | | | | | | 1 | 2 |

*Fig. 4A*
*Prior Art*

| | 1 | 2 | 3 | 4 | 5 | 6 | 7 |
|---|---|---|---|---|---|---|---|
| INSTRUCTION FETCH | 1,2 | 3,4 | | | | | |
| DISPATCH | | 2 | 1 | 3 | 4 | | |
| MULTIPLY | | | 2 | 1 | 1 | | |
| ADD | | | | 2 | 1 | 1 | |
| NORMALIZE/ ROUND | | | | | 2 | ✗ | 1 |

*Fig. 4B*

PROCESSOR AND METHOD FOR OUT-OF-ORDER EXECUTION OF INSTRUCTIONS BASED UPON AN INSTRUCTION PARAMETER

BACKGROUND

1. Technical Field

The technical field of the present specification relates in general to a method and system for data processing and in particular to a processor and method for executing instructions. Still more particularly, the technical field relates to a processor and method for selective out-of-order execution of instructions based upon an instruction parameter.

2. Description of the Related Art

Within state-of-the-art processors, out-of-order execution of instructions is often employed to maximize the utilization of execution unit resources within the processor, thereby enhancing overall processor efficiency. Several factors influence the execution of instructions out of linear program order, including the availability of execution unit resources, data dependencies between instructions, and the availability of rename and completion buffers. The performance enhancement resulting from out-of-order execution is maximized when implemented within a superscalar processor having multiple execution units capable of executing multiple instructions concurrently and independently. In state-of-the-art processors that support out-of-order execution of instructions, instructions are typically dispatched according to program order, executed opportunistically within the execution units of the processor, and completed in program order.

Although, in general, this practice leads to efficient processor performance, in some processors that support out-of-order execution, in-order dispatch of particular sequences of instructions results in inefficiency when such adherence to program order causes a dispatch stall for subsequent instructions. For example, referring now to FIG. 4A, there is depicted an instruction execution timing diagram for an exemplary instruction sequence in which the in-order dispatch of instructions results in a dispatch stall within a superscalar processor having one floating-point, one fixed-point, and one load/store execution unit. For the purpose of this discussion, assume that the floating-point execution unit of the processor is a pipelined execution unit having 3 stages: multiply, add, and normalize/round. In addition, assume that the processor can dispatch up to 2 instructions per cycle in program order, but that only one instruction can be dispatched to each execution unit during a single cycle. Finally, assume that some floating-point instructions, for example, double-precision floating-point multiplication instructions, have a longer execution latency than other floating-point instructions, such as floating-point addition and subtraction instructions.

As illustrated in FIG. 4A, instructions 1 and 2, a double-precision floating-point multiply and a single-precision floating-point subtraction, respectively, are fetched from memory during cycle 1. Next, during cycle 2, instructions 3 and 4, two fixed-point instructions, are fetched while instruction 1 is dispatched. Only instruction 1 is dispatched during cycle 2 because instructions 1 and 2 are both floating-point instructions, which require execution by the floating-point execution unit. During cycle 3, the dispatch of instructions 2–4 is inhibited since the execution within the described processor of double-precision floating-point multiply instructions (e.g., instruction 1) requires 2 cycles at the multiply and add stages, resulting in a total execution latency of 4 cycles for instruction 1. Thereafter, instruction 2–4 are dispatched during cycles 4–6, respectively. The execution of instructions 1 and 2 continues until cycles 6 and 7, when instructions 1 and 2 finish execution and the results of instructions 1 and 2 are stored within floating-point registers.

As should thus be apparent from the exemplary instruction execution timing diagram pictured in FIG. 4A, dispatching and executing instructions in program order that are directed to the same execution unit and have differing execution latencies can cause a stall of the dispatcher and consequently diminishes overall processor performance. Accordingly, there is a need for a processor which supports the selective out-of-order execution of instructions based upon a parameter of one or more instructions.

It should also be noted that it is well-known in the art to utilize various compiler optimizations to take advantage of particular architectural efficiencies by compiling a sequence of instructions in alternative program orders. However, such compilers are distinguishable from the present disclosure in that the present disclosure concerns the real-time intelligent ordering of the execution of instructions to maximize processor efficiency rather than the manipulation of the sequence of instructions within the program order.

SUMMARY

It is therefore one object of the present disclosure to provide an improved method and system for data processing.

It is another object of the present disclosure to provide an improved processor and method for executing instructions.

It is yet another object of the present disclosure to provide a processor and method for selective out-of-order execution of instructions based upon an instruction parameter.

The foregoing objects are achieved as is now described. A processor and method for out-of-order execution of instructions are disclosed which fetch a first and a second instruction, wherein the first instruction precedes the second instruction in a program order. A determination is made whether execution of the second instruction is subject to execution of the first instruction. In response to a determination that execution of the second instruction is not subject to execution of the first instruction, the second instruction is selectively executed prior to the first instruction in response to a parameter of at least one of the first and second instructions. In one embodiment, the parameter is an execution latency parameter of the first and second instructions.

The above as well as additional objects, features, and advantages of an illustrative embodiment will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4A depicts an instruction execution timing diagram in accordance with the prior art; and FIG. 4B illustrates an instruction execution timing diagram in accordance with the illustrative embodiment of a processor depicted within FIG. 1.

DETAILED DESCRIPTION

Figure 1:
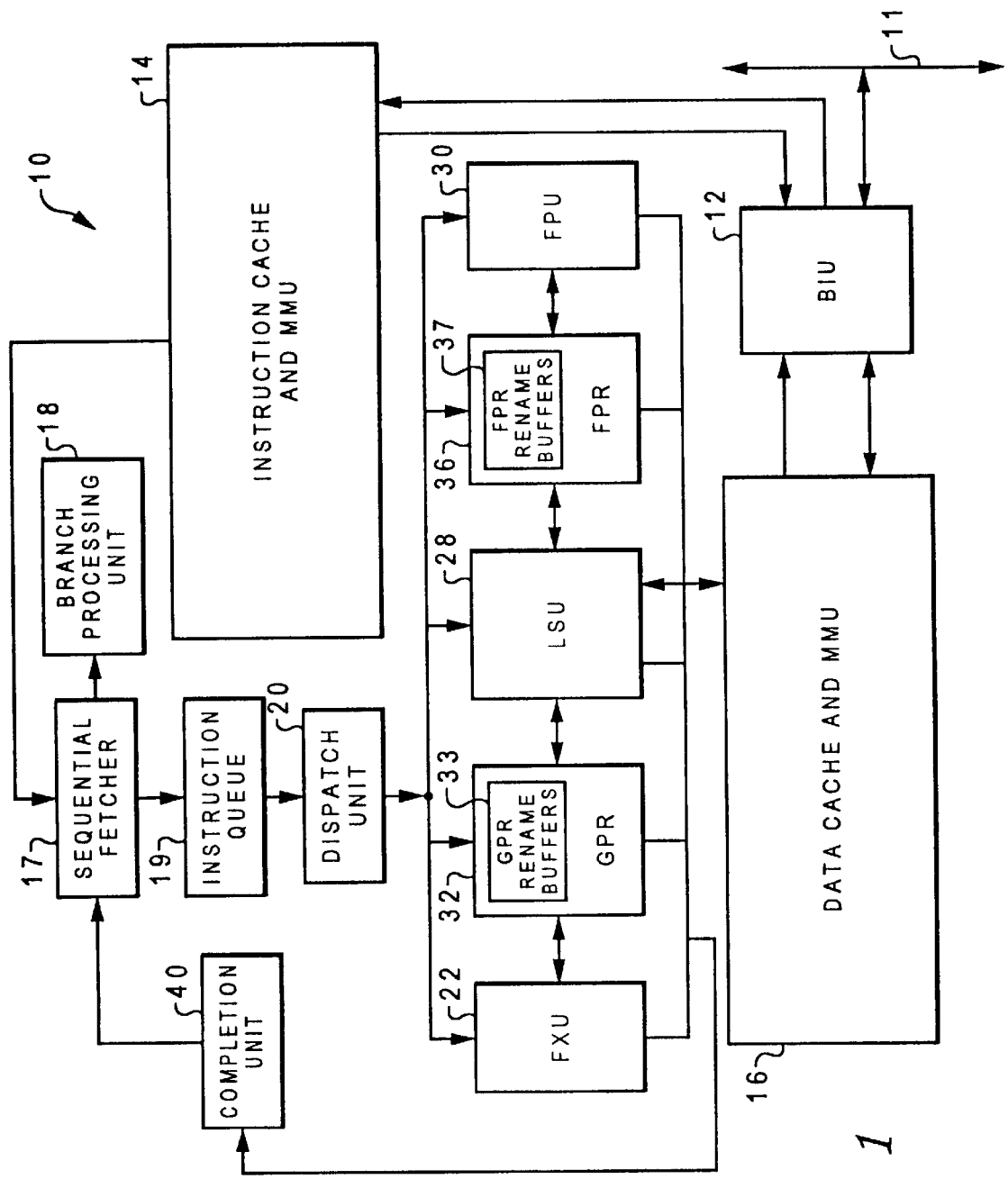
FIG. 1 illustrates a block diagram of an illustrative embodiment of a processor that supports out-of-order execution of instructions.

With reference now to the figures and in particular with reference to FIG. 1, there is depicted a block diagram of an illustrative embodiment of a processor, indicated generally at 10, for processing information in accordance with the invention recited within the appended claims. In the depicted illustrative embodiment, processor 10 comprises a single integrated circuit superscalar microprocessor. Accordingly, as discussed further below, processor 10 includes various execution units, registers, buffers, memories, and other functional units, which are all formed by integrated circuitry. Processor 10 preferably comprises one of the PowerPC™ line of microprocessors available from IBM Microelectronics, which operates according to reduced instruction set computing (RISC) techniques; however, those skilled in the art will appreciate that other suitable processors can be utilized. As illustrated in FIG. 1, processor 10 is coupled to system bus 11 via a bus interface unit (BIU) 12 within processor 10. BIU 12 controls the transfer of information between processor 10 and other devices coupled to system bus 11, such as a main memory (not illustrated). Processor 10, system bus 11, and the other devices coupled to system bus 11 together form a host data processing system.

BIU 12 is connected to instruction cache 14 and data cache 16 within processor 10. High-speed caches, such as instruction cache 14 and data cache 16, enable processor 10 to achieve relatively fast access time to a subset of data or instructions previously transferred from main memory to caches 14 and 16, thus improving the speed of operation of the host data processing system. Instruction cache 14 is further coupled to sequential fetcher 17, which fetches instructions for execution from instruction cache 14 during each cycle. Sequential fetcher 17 transmits branch instructions fetched from instruction cache 14 to branch processing unit (BPU) 18 for execution, but temporarily stores sequential instructions within instruction queue 19 for execution by other execution circuitry within processor 10.

In the depicted illustrative embodiment, in addition to BPU 18, the execution circuitry of processor 10 comprises multiple execution units, including fixed-point unit (FXU) 22, load/store unit (LSU) 28, and floating-point unit (FPU) 30. As is well-known to those skilled in the computer arts, each of execution units 22, 28, and 30 typically executes one or more instructions of a particular type of sequential instructions during each processor cycle. For example, FXU 22 performs fixed-point mathematical and logical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 typically performs single and double-precision floating-point arithmetic and logical operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the instructions are completed by transferring the result data from FPR rename buffers 37 to selected FPRs 36. As its name implies, LSU 28 typically executes floating-point and fixed-point instructions which either load data from memory (i.e., either data cache 16 or main memory) into selected GPRs 32 or FPRs 36 or which store data from a selected one of GPRs 32, GPR rename buffers 33, FPRs 36, or FPR rename buffers 37 to memory.

Processor 10 employs both pipelining and out-of-order execution of instructions to further improve the performance of its superscalar architecture. Accordingly, instructions can be executed by FXU 22, LSU 28, and FPU 30 in any order as long as data dependencies are observed. In addition, instructions are processed by each of FXU 22, LSU 28, and FPU 30 at a sequence of pipeline stages. As is typical of high-performance processors, each instruction is processed at five distinct pipeline stages, namely, fetch, decode/dispatch, execute, finish, and completion.

During the fetch stage, sequential fetcher 17 retrieves one or more instructions associated with one or more memory addresses from instruction cache 14. Sequential instructions fetched from instruction cache 14 are stored by sequential fetcher 17 within instruction queue 19. In contrast, sequential fetcher 17 removes (folds out) branch instructions from the instruction stream and forwards them to BPU 18 for execution. BPU 18 includes a branch prediction mechanism, which in one embodiment comprises a dynamic prediction mechanism such as a branch history table, that enables BPU 18 to speculatively execute unresolved conditional branch instructions by predicting whether the branch will be taken.

During the decode/dispatch stage, dispatch unit 20 decodes and dispatches one or more instructions from instruction queue 19 to execution units 22, 28, and 30. As described below in greater detail, although dispatch unit 20 typically dispatches instructions to execution units 22, 28, and 30 in program order, dispatch unit 20 dispatches selected instruction sequences to execution units 22, 28, and 30 out of program order based upon selected instruction parameters. During the decode/dispatch stage, dispatch unit 20 also allocates a rename buffer within GPR rename buffers 33 or FPR rename buffers 37 for each dispatched instruction's result data. According to a the depicted illustrative embodiment, processor 10 tracks the program order of the dispatched instructions during out-of-order execution utilizing unique instruction identifiers.

During the execute stage, execution units 22, 28, and 30 normally execute instructions received from dispatch unit 20 opportunistically as operands and execution resources for the indicated operations become available. However, in accordance with the present invention, FPU 30 also intelligently executes selected sequences of instructions dispatched to FPU 30 out of program order based upon particular instruction parameters. Each of execution units 22, 28, and 30 are preferably equipped with a reservation station that stores instructions dispatched to that execution unit until operands or execution resources become available. After execution of an instruction has terminated, execution units 22, 28, and 30 store data results within either GPR rename buffers 33 or FPR rename buffers 37, depending upon the instruction type. Then, execution units 22, 28, and 30 notify completion unit 40 which instructions have finished execution. Finally, instructions are completed by completion unit 40 in program order by transferring data results of the instructions from GPR rename buffers 33 and FPR rename buffers 37 to GPRs 32 and FPRs 36, respectively.

Figure 2:
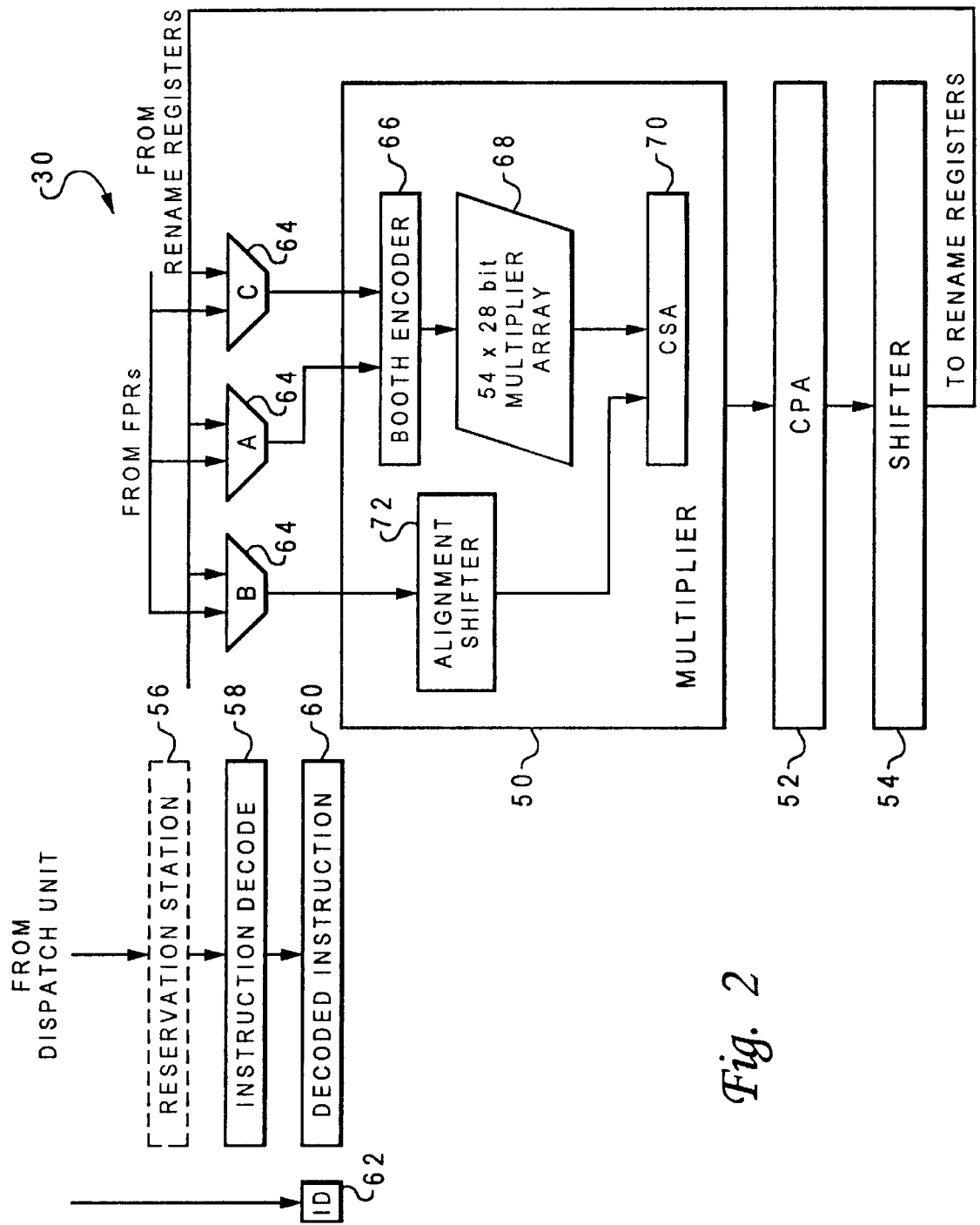
FIG. 2 depicts a more detailed block diagram of the floating-point execution unit of the processor illustrated within FIG. 1.

Referring now to FIG. 2, there is depicted a more detailed block diagram of floating-point execution unit (FPU) 30 illustrated within FIG. 1. As is typical of conventional FPUs, FPU 30 comprises a multiplier 50, a carry propagate adder (CPA) 52, and a shifter 54. Utilizing these three pipeline stages, FPU 30 is optimized to perform a multiply-add-fuse operation of the form (A×C)+B, where A, B, and C are floating-point operands received from either FPRs 36 or FPR rename buffers 37. As noted above, FPU 30 preferably includes reservation station 56, which stores one or more instructions dispatched by dispatch unit 20 to FPU 30 that cannot be immediately executed due to a data dependency or a full execution pipeline. Floating-point instructions to be executed proceed from either dispatch unit 20 or reservation station 56 to instruction decode unit 58, which as the name implies, decodes the instruction and stores decoded instruction within decoded instruction buffer 60. Instructions are identified during out-of-order execution by a unique instruction ID 62 to ensure in-order completion of the instructions by completion unit 40.

Once an instruction has been decoded by instruction decode unit 58, the specified A, B, and C operands are selected by multiplexers 64 and input into multiplier 50. According to the illustrated embodiment, the floating-point values of operands A, B, and C can be represented either as a 32-bit single-precision floating-point value or a 64-bit double-precision floating-point value. According to IEEE standards, single-precision floating-point values are represented by a 1-bit sign, an 8-bit exponent and a 23-bit mantissa; double-precision floating-point values are represented by a 1-bit sign, 11-bit exponent, and a 52-bit mantissa.

In order to minimize the processor die area allocated to FPU 30, multiplier 50 utilizes a modified Booth encoder 66 and 54-bit×28-bit Wallace tree multiplier array to perform floating-point multiplication of the A and C operands. Multiplier 50 can multiply two single-precision floating-point values within a single processor cycle. However, because Booth encoder 66 and multiplier array 68 enable a double-precision multiplicand to be multiplied by only the lower half of a double-precision multiplier during one cycle, multiplication of two double-precision floating-point values requires that multiplier 50 be double-pumped, that is, that the multiplicand be multiplied by the lower half of the multiplier during a first cycle and by the upper half of the multiplier during a second cycle. While the A and C operands are multiplied within multiplier array 68, the B operand is shifted within alignment shifter 72 to align the B operand with the product of the A and C operands. Following the multiplication of the A and C operands, the aligned B operand is added to the product within carry save adder (CSA) 70, which generates an intermediate sum and a carry. The intermediate sum and carry are then passed to carry propagate adder (CPA) 52, which adds the intermediate sum and carry generated within multiplier 50 to produce the sum (A×C)+B. Thereafter, the sum is normalized and rounded by shifter 54 and stored within one of FPR rename buffers 37. Thus, for the illustrative embodiment depicted within FIG. 2, a double-precision multiplication requires four cycles to complete, while other double-precision instructions and single-precision instructions (except divide instructions) require only three cycles to complete. As is evident from the foregoing description of the operation of FPU 30, double-precision multiply instructions have a longer execution latency than most other floating-point instructions.

Figure 3:
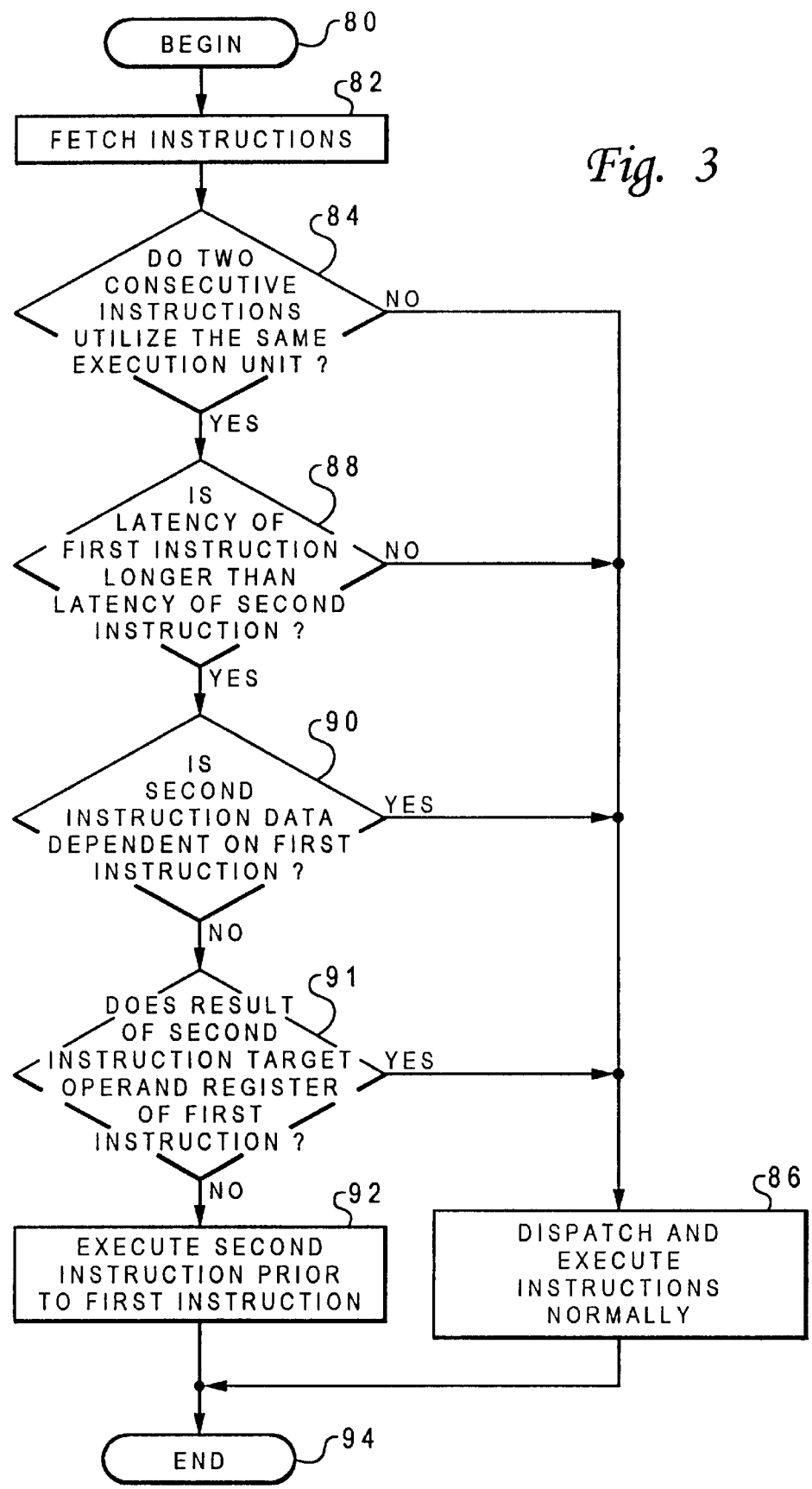
FIG. 3 is a flowchart of an illustrative embodiment of a method utilized to dispatch instructions out of program order within the processor depicted within FIG. 1.

With reference now to FIGS. 3 and 4B, there are illustrated a logical flowchart and instruction execution timing diagram for the out-of-order execution of instructions within the illustrative embodiment of a processor depicted within FIG. 1. Although FIG. 3 illustrates numerous steps in a sequential fashion for the sake of simplicity, those skilled in the art will appreciate that many of the operations to which the steps pertain may actually be performed in parallel. Referring first to FIG. 3, the process begins at block 80 and proceeds to block 82, which depicts sequential fetcher 17 fetching the next set of instructions to be executed from instruction cache 14. Branch instructions within the set of instructions are identified by sequential fetcher 17, and forwarded directly to BPU 18 for execution. The remaining sequential instructions are issued by dispatch unit 20 from instruction queue 19. As depicted within FIG. 4B, instructions 1 and 2, a floating-point double-precision multiply instruction and a floating-point single-precision substraction instruction, respectively, are fetched from instruction cache 14 during cycle 1. Similarly, instruction 3 and 4, which comprise fixed-point instructions, are fetched during cycle 2.

Assuming that instruction queue 19 does not contain other instructions, instructions 1 and 2 are available for dispatch during cycle 2. In contrast to some prior art processors, which as shown in FIG. 4A dispatch instructions only in program order, processor 10 enables particular sequences of instructions to be dispatched out-of-order to enhance processor performance. Accordingly, as illustrated within FIG. 3, prior to dispatching instructions 1 and 2, the process passes from block 82 to block 84, which depicts a determination of whether or not the next two instructions to be dispatched utilize the same execution unit. Thus, dispatch unit 20 determines, for example, whether instructions 1 and 2 should both be dispatched to FPU 30 or to different ones of execution units 22, 28, and 30. If a determination is made that the next two instruction to be dispatched do not both utilize the same execution unit, the process passes to block 86, which illustrates dispatch unit 20 dispatching the instructions normally. Thereafter, the instructions are executed and completed and the process terminates at block 94. However, if a determination is made at block 84 that the next two instructions to be dispatched both utilize the same execution unit, the process passes from block 84 to block 88, which illustrates a determination of whether or not the execution latency of the first instruction to be dispatched is longer than the execution latency of the second instruction to be dispatched. If not, the process again passes to block 86, which depicts the dispatch and execution of the first two instructions in accordance with the normal operation of processor 10.

Referring again to block 88, if a determination is made that the execution latency of the first instruction is longer than the execution latency of the second instruction, as is the case with instructions 1 and 2 in the example illustrated within FIG. 4B, the process proceeds to block 90. Block 90 illustrates a determination of whether or not a data dependency exists between the first and second instruction, that is, whether an operand of the second instruction is a data result of the first instruction. If so, the first and second instructions cannot be executed out-of-order. Therefore, the process passes to block 86 as has been described. However, if none of the operands of the second instruction are data results of the first instruction, the process passes to block 91, which illustrates a determination of whether or not the result of the second instruction targets an FPR 36 that contains an operand of the first instruction. If so, the process passes to block 86 in the manner which has been described.

Referring again to block 91, if a determination is made that the result of the second instruction does not target an FPR 36 that contains an operand of the first instruction, the process proceeds to block 92, which depicts the execution of the second instruction prior to the execution of the first instruction. In an embodiment in which FPU 30 does not include a reservation station, the out-of-order execution of the first and second instructions depicted at block 92 is accomplished, as shown within FIG. 4B, by dispatching the second instruction prior to the first instruction. Alternatively, in embodiments in which FPU 30 includes a reservation station, the swapping of the execution order of the first and second instructions can be accomplished within FPU 30 rather than during dispatch. Thus, for example, instructions 1 and 2 are both dispatched to FPU 30 during cycle 2 and execution of instruction 2 begins immediately, while instruction 1 is temporarily stored within reservation station 56.

Referring again to FIG. 4B, once instructions 1 and 2 are dispatched out-of-order, instruction 2 executes in one cycle per pipeline stage, for a total execution latency of three cycles. Thus, as can be seen in comparison with FIG. 4A, execution resources within FPU 30 (i.e., pipeline stages) are freed earlier than in prior art processors since one of the two instructions dispatched to FPU 30 completes one cycle earlier. As described above, instruction 1 takes four cycles to finish execution due to the double-pumping of the operands within multiplier 50. Returning to FIG. 3, following the execution of the first and second instructions, the process passes to block 94 and terminates.

As has been described, the illustrative embodiment supports the out-of-order dispatch and execution of instructions directed to the same execution resource which have differing execution latencies and no data dependencies. Although the described illustrative embodiment dispatches and executes floating-point instructions out-of-order, those skilled in the art will appreciate that the principles herein before described can also be applied to the out-of-order execution of instructions within multiple diverse execution units (or a single execution unit having multiple sub-units) based upon selected instruction parameters. Furthermore, it will be understood that the selected instruction parameters can be inherent to the instructions themselves and independent of the availability of execution resources.

While an illustrative embodiment has been particularly shown and described, it will be understood by those skilled in the art that various changes in form and detail may be made therein without departing from the spirit and scope of the illustrative embodiment.

What is claimed is:

1. A method of executing instructions, said method comprising:

fetching a first instruction and a second instruction from storage for execution, said first instruction preceding said second instruction in a program order;

following fetching of said first and second instructions for execution, determining whether execution of said second instruction is subject to execution of said first instruction; and in response to a determination that execution of said second instruction is not subject to execution of said first instruction, selectively executing said second instruction prior to said first instruction in response to a static execution latency parameter of at least one of said first and second instructions.

2. The method of claim 1, wherein said step of selectively executing comprises selectively executing said second instruction prior to said first instruction in response to said execution latency parameter indicating that a static execution latency of said first instruction exceeds a static execution latency of said second instruction.

3. The method of claim 1, said method being performed in a processor having one or more execution units, wherein said step of selectively executing comprises executing said second instruction prior to said first instruction within a particular one of said one or more execution units.

4. The method of claim 3, wherein said step of executing said second instruction prior to said first instruction comprises dispatching said second instruction to said particular execution unit prior to dispatching said first instruction to said particular execution unit.

5. The method of claim 3, wherein said step of executing said second instruction prior to said first instruction comprises:

dispatching both said first instruction and said second instruction to said particular execution unit according to said program order;

temporarily storing said first instruction within said execution unit; and executing said second instruction within said particular execution unit prior to executing said first instruction within said particular execution unit.

6. The method of claim 1, wherein said step of determining whether execution of said second instruction is subject to execution of said first instruction comprises determining if data results of said first instruction are an operand of said second instruction.

7. The method of claim 1, wherein said step of determining whether execution of said second instruction is subject to execution of said first instruction comprises determining if data results of said second instruction target a register containing an operand of said first instruction.

8. The method of claim 1, wherein said first and said second instructions both comprise floating-point instructions.

9. A processor, comprising:

one or more execution units for executing instructions;

a fetcher for fetching a plurality of instructions for execution, said plurality of instructions including a first instruction and a second instruction, wherein said first instruction precedes said second instruction in a program order;

means for determining, following fetching of said first instruction and said second instruction for execution, whether execution of said second instruction is subject to execution of said first instruction; and means, responsive to a determination that execution of said second instruction is not subject to execution of said first instruction, for selectively executing said second instruction prior to said first instruction in response to a static execution latency parameter of at least one of said first and second instructions.

10. The processor of claim 9, wherein said means for selectively executing comprises means for selectively executing said second instruction prior to said first instruction in response to said static execution latency parameter indicating that a static execution latency of said first instruction exceeds a static execution latency of said second instruction.

11. The processor of claim 9, wherein said means for selectively executing comprises means for selectively executing said second instruction prior to said first instruction within a particular one of said one or more execution units.

12. The processor of claim 11, wherein said means for executing said second instruction prior to said first instruction comprises means for dispatching said second instruction to said particular execution unit prior to dispatching said first instruction to said particular execution unit.

13. The processor of claim 11, wherein said means for executing said second instruction prior to said first instruction comprises:
   means for dispatching both said first instruction and said second instruction to said particular execution unit according to said program order;
   means for temporarily storing said first instruction within said execution unit; and
   means for executing said second instruction within said particular execution unit prior to executing said first instruction within said particular execution unit.

14. The processor of claim 11, wherein said particular execution unit comprises a floating-point execution unit.

15. The processor of claim 9, wherein said means for determining whether execution of said second instruction is subject to execution of said first instruction comprises means for determining if data results of said first instruction are an operand of said second instruction.

16. The processor of claim 9, wherein said means for determining whether execution of said second instruction is subject to execution of said first instruction comprises means for determining if data results of said second instruction target a register containing an operand of said first instruction.

17. A data processing system, comprising:
   a memory;
   a bus coupled to said memory;
   a processor coupled to said bus, said processor including:
      one or more execution units for executing instructions;
      a fetcher for fetching a plurality of instructions for execution, said plurality of instructions including a first instruction and a second instruction, wherein said first instruction precedes said second instruction in a program order;
      means for determining, following fetching of said first instruction and said second instruction for execution, whether execution of said second instruction is subject to execution of said first instruction; and
      means, responsive to a determination that execution of said second instruction is not subject to execution of said first instruction, for executing said second instruction prior to said first instruction in response to a static execution latency parameter of a least one of said first and second instructions.

18. The data processing system of claim 17, wherein said means for selectively executing comprises means for selectively executing said second instruction prior to said first instruction in response to said static execution latency parameter indicating that a static execution latency of said first instruction exceeds a static execution latency of said second instruction.

19. The data processing system of claim 17, wherein said means for selectively executing comprises means for selectively executing said second instruction prior to said first instruction within a particular one of said one or more execution units.

20. The data processing system of claim 19, wherein said means for executing said second instruction prior to said first instruction comprises means for dispatching said second instruction to said particular execution unit prior to dispatching said first instruction to said particular execution unit.

21. The data processing system of claim 19, wherein said means for executing said second instruction prior to said first instruction comprises:
   means for dispatching both said first instruction and said second instruction to said particular execution unit according to said program order;
   means for temporarily storing said first instruction within said execution unit; and
   means for executing said second instruction within said particular execution unit prior to executing said first instruction within said particular execution unit.

22. The data processing system of claim 19, wherein said particular execution unit comprises a floating-point execution unit.

23. The data processing system of claim 17, wherein said means for determining whether execution of said second instruction is subject to execution of said first instruction comprises means for determining if data results of said first instruction are an operand of said second instruction.

24. The data processing system of claim 17, wherein said means for determining whether execution of said second instruction is subject to execution of said first instruction comprises means for determining if data results of said second instruction target a register containing an operand of said first instruction.

* * * * *

UNITED STATES PATENT AND TRADEMARK OFFICE
CERTIFICATE OF CORRECTION

PATENT NO.   :   5,872,948
DATED        :   February 16, 1999
INVENTOR(S)  :   Mallick et al.

It is certified that error appears in the above-identified patent and that said Letters Patent is hereby corrected as shown below:

On the title page, item [75], please change the inventor's name "Rajesh Bikhubhai Patel" to --Rajesh Bhikhubhai Patel--.

Signed and Sealed this

Twenty-sixth Day of October, 1999

Attest:

Q. TODD DICKINSON

Attesting Officer

Acting Commissioner of Patents and Trademarks